Dec. 6, 1966  C. V. WATSON  3,289,550
METERING DIAPHRAGMS
Filed March 14, 1961  3 Sheets-Sheet 1
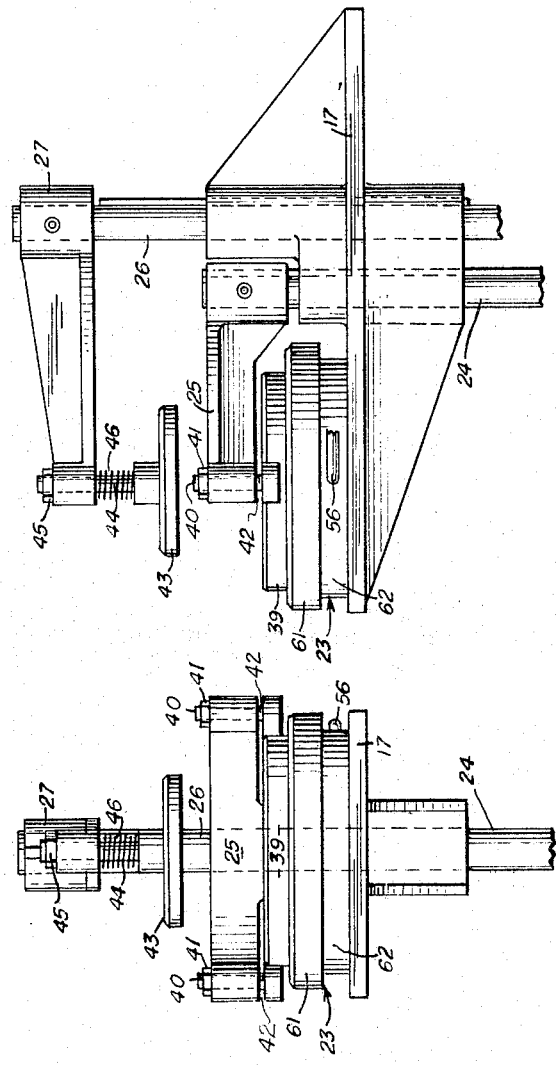
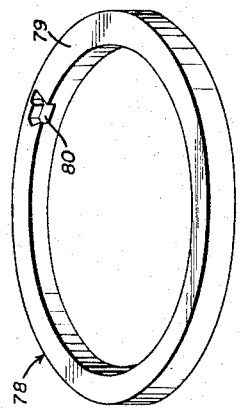
INVENTOR
C. VERNON WATSON
BY *Fisher, Christen & Sabin*
ATTORNEYS Dec. 6, 1966

C. V. WATSON 3,289,550

METERING DIAPHRAGMS

Filed March 14, 1961

INVENTOR
*C. VERNON WATSON*

BY *Fisher, Christen & Goodson*

ATTORNEYS

Dec. 6, 1966  C. V. WATSON  3,289,550
METERING DIAPHRAGMS

Filed March 14, 1961  3 Sheets-Sheet 3

INVENTOR
C. VERNON WATSON

BY Fisher, Christen & Gordson
ATTORNEYS

United States Patent Office 3,289,550
Patented Dec. 6, 1966

3,289,550
METERING DIAPHRAGMS
Charles Vernon Watson, Buena Vista, Va., assignor to Reeves Brothers, Inc., New York, N.Y., a corporation of New York
Filed Mar. 14, 1961, Ser. No. 107,280
4 Claims. (Cl. 92—99)

This invention relates to precision molded articles and, more particularly, to the precise art of diaphragms employed in measuring instruments and equipment such as gas meters.

The manufacture of diaphragms for gas measuring equipment is highly precisional and specialized, requiring the highest possible degree of skill and reproducible accuracy. Each diaphragm must have a particular configuration and whether they are circular, oval, square, rectangular, trapezoidal or otherwise shaped, they must be identical with each other diaphragm of the same shape in order to be capable of providing the same, consistently accurate, measurements when installed in measuring apparatus. For example, when the diaphragms are circular, they must have identical radial cross-sections in all directions in order to be reliable. Any flaws or differences in the radial cross-sections give rise to unpredictable resistances to the proper flexure of the diaphragm resulting in inconsistent movements thereof and unpredictable measurements. In some cases, such inconsistencies can be corrected but, in most cases, no correction is possible.

Heretofore, diaphragms for gas meters and other fluid measuring equipment were made by skilled artisans using hand techniques in the efforts to obtain reasonably reproducible accuracy required by users of measuring equipment. These prior manufacturing methods of necessity, were time-consuming, requiring several hours for the production of a diaphragm.

It is therefore a primary object of this invention to provide for the manufacture of diaphragms which are precisely shaped and weighted.

Another object is the provision of novel diaphragms which are superior to prior diaphragms in the reduction of inertial resistance in the portions thereof which are displaced in effecting measurements by meters in which they are installed.

Another object is to provide novel diaphragms which are more accurate, rugged and durable and simpler to install than heretofore known diaphragms.

Further objects and advantages of this invention will be apparent from the following detailed description of several embodiments thereof described in conjunction with the attached drawings, of which:

FIG. 1 is a front elevation in cut-away of one station of a turret molding apparatus for producing the diaphragms of this invention;

FIG. 2 is a side elevation of said station shown in FIG. 1;

FIG. 6 is a perspective view looking down from above of one type of retaining ring to be used in conjunction with the mold shown in FIGS. 4 and 5 for making the diaphragm of FIG. 3;

Figure 3:
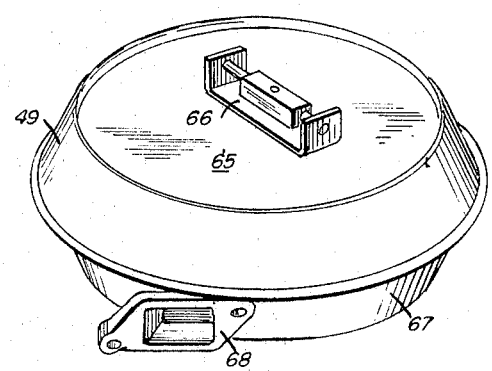
FIG. 3 is a perspective view of another type of diaphragm assembly made by the present invention.

The present invention provides novel diaphragms of high precision and a system, process and apparatus for manufacturing such diaphragms in mass quantities at high production rates. The new gas meter diaphragms of this invention are capable of greater measuring accuracy and are more durable and reliable, less expensive and easier to produce than heretofore-known gas meter diaphragms. By the practice of this invention, it is now possible to manufacture superior gas meter diaphragms in a fraction of the time previously required.

Referring now to FIGS. 1 and 2, there is shown a platen 17 on which is mounted a vacuum mold 23 which is suitably connected to a vacuum supply (not shown). Means for heating the vacuum mold, e.g., circulating heated oil, electrical, radiant, high frequency means, etc., are also provided (not shown).

Inwardly from the vacuum mold, there is slidably mounted on a platen 17, a first rod 24 having attached to its upper end a yoke 25 which extends outwardly over said vacuum mold 23. A second rod 26 is slidably mounted on the platen 17 inwardly from the first cam rod 24. To the upper end of the second rod is attached an arm 27 which extends outwardly over vacuum mold 23. The arms of the yoke 25 extend outwardly above the vacuum mold 23, and, at diametrically opposed points above the periphery of the vacuum mold 23, slidably mount a retaining ring 39 by means of pins 40 and nuts 41. A compression spring 42 is interposed on the pin 40 between the retaining ring 39 and the arms of the yoke 25. A sufficient tolerance is provided between the pin 40 in the arm of the yoke 25 so as to permit the proper alignment of the retaining ring 39 with the top of the vacuum mold 23.

The arm 27 slidably mounts a pressure pad 43 concentrically over the vacuum mold 23 by means of a pin 44 and nut 45. A compression spring 46 is interposed around the pin 44 between the arm 27 and the pressure pad 43 and sufficient tolerance is provided between the pad 43 and the arm 27 to permit the proper alignment of the pressure pad 43 with respect to the upper face of the vacuum mold 23.

It will be noted also that fine adjustments can be made to the pressure pad 43 by turning the nut 45 to vary the height of said pressure pad over the vacuum mold 23 as desired. The retaining ring 39 can also be adjusted to provide fine alignment with the vacuum mold 23 by turning one or both of nuts 41 to raise, or lower, one, or both, sides of said retaining ring as desired.

The rods 24 and 26 can be moved in up-and-down action by manual means although it is preferable to do so by employing any well known mechanical means.

A description of the various novel vacuum molds 23 which can be employed will provide a clearer understanding of the operation of the molding system described hereinabove.

A type of diaphragm assembly is illustrated in FIG. 3. This type of diaphragm assembly comprises a center disc 65, having a bracket assembly 66 mounted thereon, which is bonded concentrically to a planar central portion of a flexible diaphragm 49. The peripheral edges of the diaphragm 49 are bonded to the peripheral lip of a diaphragm pan 67. The diaphragm 49, as shown, is in its extended position wherein the center disc 65 is at or near its greatest distance of separation from the diaphragm pan 67. The bracket assembly 66 permits pivotal connection of the center disc 65 to the measuring mechanism of a gas meter (not shown), or other devices, in which the diaphragm assembly shown in FIG. 3 is installed. The diaphragm pan 67, similarly, has a vent fixture 68 which co-operates with the mechanism of the gas meter in which the diaphragm assembly is to be installed.

Figure 5:
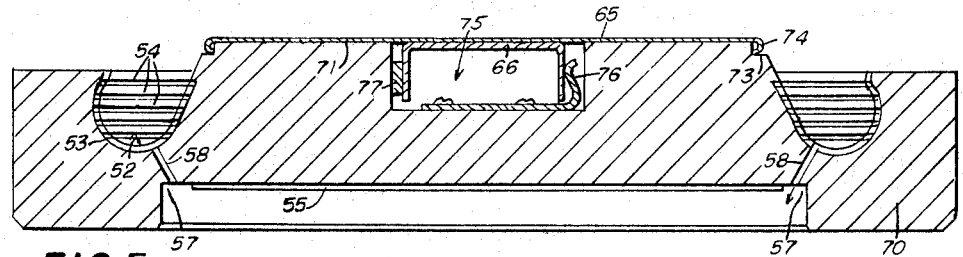
FIG. 5 is a cross-section on line 8—8 of FIG. 4.
Figure 4:
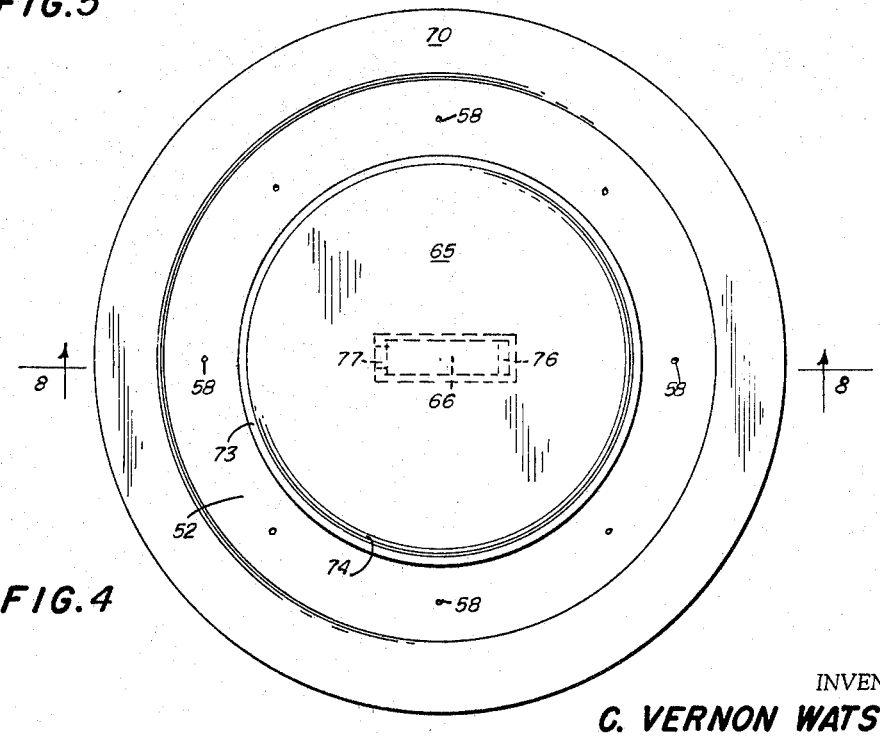
FIG. 4 is a plan view of one type of vacuum mold employed in making the diaphragm of FIG. 3.

The type of diaphragm assembly shown in FIG. 3 can be made in the vacuum mold shown in FIGS. 4 and 5 employing the upper mold piece 70 shown therein with the retaining ring 78, shown in FIG. 6. Referring to these figures, the vacuum mold 70 has an upper mold face 71 defining the shape of the diaphragm pan 67. The central portion of the upper mold face 71 is planar and circular. The outer portion of mold face 71 comprises the peripheral valley 52 through which radial vacuum distributing grooves 53 extend to the peripheral edge of the mold face. Several concentric vacuum distributing grooves 54 are provided in the surface of the peripheral valley and an annular recess 57, radially extending vacuum branch grooves 55 and ports 58 are provided in the under, recessed surface of mold piece 70. The planar circular central portion 71 of the mold face is formed with a recess 73 along its peripheral boundaries to accommodate a rolled or turned lip 74 of the center disc 65. The co-operation of said rolled lip 74 with the recess 73 assures centering of the center disc 65. A recess 75 is also provided in the center of the circular planar central portion 71 and contains a fixture comprising the spring metal strip 76 and guide block 77 mounted therein, as shown, for positioning and locating the bracket 66, which is attached as by adhesive, or other method of bonding, i.e., rivet or self-bonding or molded bracket, to the center disc 65. Thus, the center disc 65, having a heat curable adhesive layer on the surface opposite to that on which the bracket 66 is mounted, is placed on the planar central surface 71 such that the bracket is held in the recess 75 between spring strip 76 and guide block 77 and such that the rolled lip 74 of said disc fits into the annular recess 73. The diaphragm sheet material of yieldable, impermeable, heat curable sheet material, or thermo-plastic sheet material, is then laid over the center disc and the entire mold face, including the peripheral valley and at least a portion of the planar annular portions of the mold face. The diaphragm pan 67 then is placed concentrically on the mold face and centered by means of the retaining ring 78, shown in FIG. 6.

Referring to FIG. 6, the retaining ring 78 is illustrated with its under surface 79 (i.e., the surface which faces the mold when said retaining ring is in operative position) turned upwards. Recess 80 is provided in the surface 79 to loosely accommodate the fixture 68 mounted on the pan 67. The inner diameter of the retaining ring 78 can be sufficiently larger than the outer diameter of the diaphragm pan 67 so as to clear said pan and permit the surface 79 of said ring to pressure contact the diaphragm blank to seal it to the mold face. Alternatively, the inner diameter of retaining ring 78 can be slightly smaller than the largest diameter of pan 67 such that said pan can be pushed with slight pressure up into said retaining ring and held there by friction between said pan and said ring. The pressure of the retaining ring against the diaphragm blank also seals the blank to said planar peripheral portion of the mold piece 70 such that the blank can be drawn into the peripheral valley 52 upon application of vacuum through the various vacuum distribution lines, conduits, grooves, etc. When said blank is drawn into the peripheral valley 52, it pressure bears against the center disc 65 and with the aid of heat is bonded thereto. The recess 80 of said retaining ring not only accommodates the fixture 68 but can be used to center said pan with regard to the center disc 65 and the diaphragm blank and a pressure pad 43 similar to that shown in FIGS. 1 and 2 can subsequently be brought to press on the bottom of the pan 67 to force the peripheral lip thereof into pressure contact with the diaphragm blank. The outer surface of the lip of the diaphragm pan is coated with a layer of heat-curing adhesive capable of bonding the material of said diaphragm pan to the material of the diaphragm blank or sheet material. The pressure pad 43 (e.g., as shown in FIGS. 1 and 2) engages the bottom of the diaphragm pan 67 to force the adhesive-coated surface of said lip into pressure contact with the diaphragm blank or sheet material after retaining ring 78 has been brought into sealing engagement with the blank and vacuum has been applied.

Figure 7:
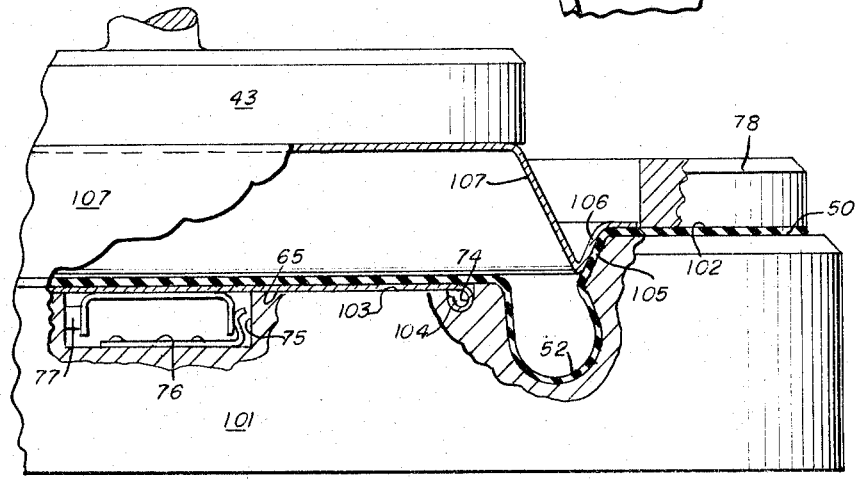
FIG. 7 is an elevation in partial section of another type of vacuum mold and associated pressure pad and retaining ring which can be used for making the diaphragm assembly shown in FIG. 3.

FIG. 7 illustrates another type of vacuum mold and associated retaining ring and pressure pad for molding diaphragms of the type shown in FIG. 3. In this embodiment, an upper mold piece 101, similar to that shown in FIG. 5, is provided with the exception that the planar peripheral portion 102 of said mold piece is raised above the central planar portion 103 and a narrow annular groove 104 in the outer portions of said central planar portion 103 is provided to accommodate the rolled lip 74 of an otherwise flat center disc 65. The bracket 66 is fixed, as by bonding, to the center, underside of disc 65 and is held in the recess 75 by spring metal strip 76 and guide block 77. The portion 105 of the mold piece 101 between the planar peripheral portions 102 and the peripheral valley 52 is tapered inwardly towards said valley 52 in the shape of the set back lip 106 of diaphragm pan 107.

The retaining ring 78 is similar to that shown in FIG. 6 and has an inner diameter slightly smaller than the largest diameter of the pan 107 such that said pan can be pushed with slight pressure up into said retaining ring and held there by friction between the inner surface of said ring and the edges of lip 106 of said pan. If necessary, longitudinal grooves can be provided on the inner surface of retaining ring 78 to permit air access to the inner portions of pan 107 when said ring, within which said pan is positioned, is brought down into sealing contact with the diaphragm blank 50.

In operation, the central disc 65 is inserted on the central portion 103 with the bracket 66 within the recess 75 and the lip 74 within the groove 104. The diaphragm blank 50 is placed over the disc 65 and mold face of mold 101. The pan 107 is pushed up into the retaining ring 78 far enough to permit access of air from above the pan through longitudinal grooves in the inner surface of said retaining ring to the bottom of said pan when said retaining ring seals against the blank 50. The retaining ring 78 is then lowered against the blank 50 to seal it against the mold 101. Vacuum is applied to draw the blank 50 into the shape of the mold face and particularly into the shape of the peripheral valley 52. Pressure pad 43 is then lowered against the bottom of pan 107 to move said pan downwardly and into pressure contact with the blank 50. The planar portion of lip 106 facing blank 50 is coated with a heat-setting adhesive capable of bonding the material of the pan 107 to the material of the blank 50. Heat is applied as hereinbefore described to cure the blank 50 and set the adhesive on lip 106. The number and size of longitudinal grooves in the inner surface of retaining ring 78 can be limited so that the downward movement of the pan 107 creates sufficient air compression within said pan to ensure faithful conformance of the blank 50 to the valley 52.

Figure 8:
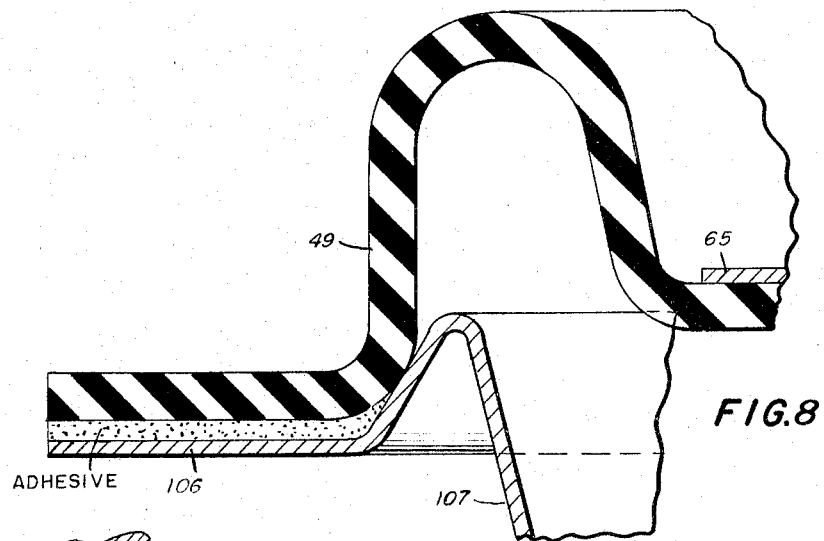
FIG. 8 is an enlarged fragmentary cross-sectional view of a diaphragm assembly similar to that shown in FIG. 3.

FIG. 8 illustrates a cross-section of one type of superior diaphragms made in accordance with this invention. An important feature in the superiority of these diaphragms is the uniformity of juncture of the diaphragm 49 with the lip 106 (FIG. 8). As opposed to prior art diaphragms which involved tying the diaphragm 49 to a perpendicular inner flange on a circular frame similar to gasket 81, the novel diaphragms shown in FIG. 8 have a more uniform free area, i.e., area between center disc 65 and the juncture with the lip 106, and a uniform circumferential juncture of free area and lip in the plane of the lip, thus providing consistent accuracy in an individual diaphragm and/or from diaphragm to diaphragm. The pan and diaphragm construction shown in FIG. 8 provides an additional advantage in that there is no tendency of the free area to snap out as the center disc is moved from one extreme to the other as is prevalent in heretofore known pan and diaphragm constructions. Instead, the free area of the novel pan and diaphragm construction (FIG. 8) tends to smoothly roll out on movement of the center disc from one extreme to the other, thus avoiding error-inducing and damaging wrinkles in the free area.

Referring now to FIGS. 1 and 2 in particular, the operation of the molding system shown therein and described hereinabove will now be described in detail. The vacuum mold 23 which will provide the desired molded diaphragm is placed in its position on the platen 17 and its associate retaining ring 39 is suitably mounted on the yoke 25 as hereinabove described. In this connection, a typical molding cycle would consist of the following sequence:

(1) With the pressure pad or ring (43, 90 or 98) and retaining ring (39 or 91), in raised position above the vacuum mold 23, and vacuum valve in the off position such that no vacuum is being applied, the diaphragm blank, center disc, gasket and/or diaphragm pan are inserted in the proper sequence.

(2) The retaining ring is lowered to force the diaphragm blank into vacuum-sealing engagement with the upper surface of the mold 23.

(3) The vacuum valve is actuated, and vacuum is applied and maintained for a sufficient length of time to permit curing or setting of the diaphragm blank and adhesive on the center disc, if used. After the diaphragm blank has been drawn into the mold, the pressure pad or ring is lowered to force the diaphragm blank and the gasket or lip of the diaphragm pan into pressure engagement and maintained there until the adhesive on the gasket or lip has set.

(4) The vacuum valve is then turned off, releasing the vacuum in the mold.

(5) The pressure pad or ring and retaining ring 39 are raised.

At the time where the retaining ring and pressure pad are in their uppermost positions and the vacuum valve is in its off position, e.g., step 1 in the above sequence (just preceding the time where said retaining ring and said pressure pad are lowered), an operator inserts the necessary diaphragm assembly parts such as the diaphragm blank, center disc, gasket and/or pan. At the end of step 5 and preceding step 1, the operator removes the molded diaphragm and/or diaphragm assembly and then inserts the necessary parts for the next cycle. The above-mentioned sequence is only illustrative and various changes and substitutions can be made as desired, or needed, without departing from the scope of this invention.

In place of manual feeding and manual removing of molded and assembled articles, automatic mechanical feeding and removal can be employed to take the place of operators. Also, the diaphragm blank employed can be of the exact diametrical size as the finished diaphragm desired; in which case no trimming of excess material from the finished diaphragm is necessary. Alternatively, a diaphragm blank of substantially rectangular, circular, oval or octagonal shape can be employed; in which event, a suitable trimming device will be necessary to cut off excess material.

It is preferable to maintain the vacuum mold at a suitably high temperature for curing the diaphragm blank in the mold. However, if desired, the temperature can be varied somewhat by switching means wherein, for example, the mold will be heated at a time while vacuum is being applied and the heat turned off at a time when no vacuum is being applied. In any event, it is sufficient to maintain the mold 23 at the necessary high temperature by continuously heating said mold, for example, by electrical means or by circulating oil.

The diaphragm blank material is any suitable material having properties fitting the conditions for which the diaphragm is intended. For example, in gas metering, the diaphragm blank material ordinarily used is a woven fabric of cotton or other textile fiber which is coated on both sides with a curable, dry mixture of various synthetic and natural polymers and fillers which, after curing, will provide a flexible, gas-impermeable laminate capable of resisting attack by oils, hydrocarbons and other materials with which the finished diaphragm is brought into contact. A particularly advantageous type of diaphragm blank material is a non-woven sheet of cotton or other fibers, some of which are parallelly oriented in one direction and others of which are parallelly oriented in another direction angular to the first direction and all of which are surrounded and bonded together by a natural or synthetic rubber compound which can be the above-mentioned curable, dry mixture. As thermosetting adhesives for bonding the diaphragm to the center disc and/or diaphragm pan, there can be used any bonding material which will dry to a substantially non-tacky condition after application at normal temperatures but which will give suitable adhesion after applying heat and pressure without deteriorating the flexibility, impermeability or aging properties of the cured diaphragm. As examples, an epoxy-resin based cement satisfactorily bonds the diaphragm to metals or other materials. Instead of employing a thermosetting adhesive, the diaphragm can be directly vulcanized to the pan and/or disc. The pan and center disc is made of a suitably rigid material, e.g., metal or suitably rigid synthetic plastic. The center disc is preferably light weight and can be made of a light-weight metal or plastic material or bonded fiber.

As compared with the prior methods and apparatus, this invention provides a remarkable step forward in the art of molding diaphragms. One outstanding advantage of this invention is the extraordinary reduction in the time required for molding diaphragms of from several hours to several minutes per diaphragm and the elimination of the bulky and expensive equipment, such as oven rooms and trucks for moving assembled molds from the mold assembly area into the oven room for curing and out again for cooling and disassembly, heretofore employed. Furthermore, the production rate of the vacuum molds described and claimed herein is far superior to heretofore-known molds and far more diaphragms can be produced with far fewer molds than heretofore possible.

As a result of the new and improved system, method and apparatus of this invention, far superior diaphragms of the known variety can be made. In using the present vacuum molding system, method and apparatus, uniform stretching and distribution of the diaphragm blank material is obtained in forming the desired diaphragm as opposed to the dependence of heretofore-known methods and apparatuses on the judgment and strength of the operator in pulling at the corners of the blank material while shaping the diaphragm. As a result, far fewer rejects are experienced by practicing this invention. Higher yield from and fuller utilization of blank material is permitted by this invention, since the "ears" or "handles" (i.e., corners) of the heretofore necessarily square or rectangular blanks are no longer needed for manually stretching the blank in the mold. Now the diaphragm blank can be cut in the approximate outline of the desired diaphragm and little, if any, blank material is wasted in making the diaphragm blank and/or tin trimming excess blank material (e.g., "ears" or "handles") from the finished diaphragm.

Less rejects because of scuffing, scraping, tearing, puncturing, etc., are obtained by the use of the novel system, method and apparatus, since the use of springs or clamps (required in the prior art hand method to clamp the shaped diaphragm blank prior to curing) and the necessity for stacking loaded molds on trucks for further transport into an oven room and other handling of loaded molds are eliminated. Also, by practicing this invention there are less rejects caused by uneven flow of curable component in the blank material brought on by non-uniformity of pressure on the shaped blank during curing in heretofore-known methods and equipment wherein greater pressures occured in areas of the blank which were perpendicular or more perpendicular to the pressure direction of the male and female molds. Because of the elimination of causes for scuffing, tearing, scraping, puncturing, etc., and the substantially uniform application of pressure over the entire shaped area of the diaphragm blank (thus averting the uneven flow of curable component of the blank), the present invention can permit the use of blank material having the curable component in a substantially uncured state or having lower degree of pre-cure.

The novel diaphragm and diaphragm assemblies of this invention are remarkably superior to heretofore-known diaphragms and assemblies in measuring accuracy, accurate reproducibility, durability (not only of the diaphragm or assembly but also of the equipment in which it is used), duration of accuracy, capacity, quietness of operation, etc. The center disc when employed in a novel diaphragm assembly is always precisely centered in the proper place in the central area of the diaphragm membrane, thereby providing accurate reproducibility of diaphragm operation as opposed to prior art methods of attaching the center disc, e.g., manually, after the diaphragm membrane has been shaped and cured, resulting in eccentric attachments and lower operating accuracy and differences in operating characteristics from diaphragm to diaphragm which difference necessitated separate and different compensating corrections for each diaphragm. Additionally, the use of but one center disc, instead of the two needed by the prior art, and the use of light-weight materials in the center discs provide the novel diaphragms and/or assemblies with an extremely light-weight center area, thus, reducing power absorption during use and higher operational capacity, reducing diaphragm reversal at the extreme "in" or "out" stroke and giving better proof repeatability or permitting the use of lighter weight (viz less costly) membrane material, reducing the noise level from movements of the diaphragm and associated equipment, and other outstanding advantages, including, ease of assembly, less wear on parts associated with the diaphragm and less break-down in the field.

Similarly, the pan when employed in a novel diaphragm assembly is always properly centered with respect to the diaphragm membrane, and diametrical and circumferential distortion is eliminated, since clamping bands, wires, springs, etc., heretofore employed in diaphragm assemblies are obviated. As a result, the novel diaphragm assemblies have little tendency toward "crowsfooting" of the membrane and excessive wear of associated parts such as was experienced in the prior art assemblies. Furthermore, because of the more uniform alinement of the membrane, pan of the novel diaphragm assemblies, superior reproducible proofs result, both immediately and during the service life of the equipment in which the assemblies are used, and the total differentials and differential "breaks" or "fluctuations" during a single cycle are favorably handled. Additional outstanding advantages are available by practicing the invention and include elimination of costly and sometimes troublesome strings, springs, clamps, rivets, bands, etc., previously used and the time, effort and facilities for attaching such fixtures.

Diaphragms and diaphragm assemblies for use in gas measuring devices, gas pressure regulators, aqua-lungs, fuel pumps, air compressors for portable spraying equipment, pressure-responsive control apparatus and the like can be manufactured by employing the principles and detailed teachings of this invention. Such diaphragms can be of any size or shape, e.g., circular, oval, square, rectangular, trapezoidal, "cylindrical" or otherwise. The diaphragm membrane can be of any desired configuration, e.g., a single convolute, multiple convolutes or otherwise. The diaphragm assemblies in accordance with this invention furthermore can be so shaped as to define a relatively deep cavity with the diaphragm membrane forming the side walls as free area and the bottom wall which can be the relatively rigid area as by bonding to a light-weight relatively rigid member, e.g., as in a "cylindrical" or loop diaphragm. Various other modifications and changes can be made to this invention without departing from the principle and spirit of this invention as set forth in the appended claims.

I claim:

1. An improved gas meter diaphragm assembly comprising a pan having a bottom wall and a side wall extending upwardly from said bottom wall for a distance, thence extending downwardly and outwardly at an angle, and peripherally terminating in a substantially planar peripheral lip, and a flexible, impermeable sheet formed with a central portion, an endless trough of uniform size and shape surrounding said central portion, and a substantially planar peripheral portion around said trough, said peripheral portion being formed substantially in the outline of said lip of said pan and being sealed to said lip to dispose said trough substantially above said pan and to close said pan.

2. An improved gas meter diaphragm assembly comprising a pan having a bottom wall and a side wall extending upwardly from said bottom wall for a distance, extending downwardly and outwardly at an angle, and forming a peripheral lip; a diaphragm membrane comprising a flexible, impermeable sheet formed with a central portion, an endless trough of uniform size and shape surrounding said central portion, said trough defining the free area of said diaphragm membrane, and a peripheral portion around said trough, said peripheral portion being formed substantially in the outline of said lip of said pan and being sealed to said lip to dispose said trough substantially above said pan and to close said pan; and a relatively rigid, light-weight center member formed substantially in the outline of said central portion, said center member overlying and being bonded to said central portion.

3. The improved diaphragm assembly as claimed in claim 2 wherein said bottom wall, said side wall and said lip of said pan; said central portion, said trough and said peripheral portion of said membrane; and said center member are all circular and co-axial with respect to each other.

4. An improved diaphragm assembly for use in gas meters comprising, a diaphragm pan having an open mouth defined by a lip; a shaped diaphragm membrane comprising a fabric coated on both sides with a cured polymer, said membrane having a central portion, free area in the shape of an endless trough around said central portion and peripheral portions around said trough and having its peripheral portions bonded to said lip to close said mouth; and a center member bonded to the central portions of said membrane within and spaced from said peripheral portions thereof.

References Cited by the Examiner

UNITED STATES PATENTS

| | | | |
|---|---|---|---|
| 1,790,206 | 1/1931 | Farmer | 92—104 |
| 2,275,712 | 3/1942 | Zand | 92—100 |
| 2,335,276 | 11/1943 | Heintz | 92—99 |
| 2,456,093 | 12/1948 | Swedlow | 156—285 |
| 2,642,090 | 6/1953 | Barr | 92—100 |
| 2,645,062 | 7/1953 | Senesky | 92—102 |
| 2,720,564 | 10/1955 | Soreng et al. | 92—99 |
| 2,722,962 | 11/1955 | Hampshire et al. | 156—580 |
| 2,793,621 | 5/1957 | Aron | 92—99 |
| 2,920,655 | 1/1960 | Dwyer | 137—793 |
| 2,976,726 | 3/1961 | St. Clair et al. | 92—103 |
| 2,982,310 | 5/1961 | West | 137—793 |
| 2,998,343 | 8/1961 | Gold et al. | 137—795 X |

FOREIGN PATENTS

| | | |
|---|---|---|
| 622,532 | 6/1961 | Canada. |
| 906,226 | 3/1954 | Germany. |

MARTIN P. SCHWADRON, *Primary Examiner.*

C. F. KRAFFT, RICHARD B. WILKINSON, SAMUEL LEVINE, MARK NEWMAN, *Examiners.*

M. E. ROGERS, H. G. SHIELDS, A. S. ROSEN, I. C. COHEN, *Assistant Examiners.*